US011952888B2

(12) United States Patent
Keusgen et al.

(10) Patent No.: US 11,952,888 B2
(45) Date of Patent: Apr. 9, 2024

(54) DATA COMMUNICATION IN THE MICROWAVE RANGE USING ELECTRICALLY CONDUCTIVE ELEMENTS IN A CONSTRUCTION MACHINE

(71) Applicants: FRAUNHOFER-GESELLSCHAFT ZUR FÖRDERUNG DER ANGEWANDTEN FORSCHUNG E.V., Munich (DE); HERRENKNECHT AG, Schwanau (DE)

(72) Inventors: Wilhelm Keusgen, Berlin (DE); Mathis Schmieder, Berlin (DE); Frederic Seng, Kenzingen (DE); Alexander Frey, Riegel (DE); Felix Weber, Hofweier (DE)

(73) Assignee: Herrenknecht AG, Schwanau (DE)

( * ) Notice: Subject to any disclaimer, the term of this patent is extended or adjusted under 35 U.S.C. 154(b) by 90 days.

(21) Appl. No.: 17/439,560

(22) PCT Filed: Mar. 20, 2020

(86) PCT No.: PCT/EP2020/057810
§ 371 (c)(1),
(2) Date: Sep. 15, 2021

(87) PCT Pub. No.: WO2020/193416
PCT Pub. Date: Oct. 1, 2020

(65) Prior Publication Data

US 2022/0251947 A1 Aug. 11, 2022

(30) Foreign Application Priority Data

Mar. 22, 2019 (EP) .................................... 19164653

(51) Int. Cl.
*E21B 47/13* (2012.01)
*E21B 17/00* (2006.01)
(Continued)

(52) U.S. Cl.
CPC ............ *E21B 47/13* (2020.05); *E21B 17/003* (2013.01); *E21B 17/0285* (2020.05); *H01Q 1/225* (2013.01)

(58) Field of Classification Search
CPC .... E21B 47/13; E21B 17/003; E21B 17/0285; E21B 17/028; H01Q 1/225
See application file for complete search history.

(56) References Cited

U.S. PATENT DOCUMENTS 7,303,029 B2 * 12/2007 Hall ........................ E21B 47/13 166/65.1
2002/0135179 A1 * 9/2002 Boyle ..................... E21B 47/13 285/21.1

(Continued)

FOREIGN PATENT DOCUMENTS

WO WO-2011066624 A1 * 6/2011 ........... E21B 47/122

*Primary Examiner* — Amine Benlagsir
(74) *Attorney, Agent, or Firm* — Mark Rodgers

(57) ABSTRACT

A coupling element connectable to a string of one or more pipes, for example, a drill string of one or more pipes or drill pipes is provided. The coupling element is configured to excite, responsive to a data signal fed to the coupling element, an electromagnetic wave in the string. The coupling element comprises a feed portion at a first end of the coupling element, the feed portion to receive the data signal, a first electrically conductive portion extending from the feed portion towards a second end of the coupling element, the second end to be connected to the string for forming an electrically conductive connection between the first electrically conductive portion and the string, and a second electrically conductive portion extending from the feed portion towards the second end of the coupling element. The first (Continued)

and second electrically conductive portions are arranged so as to define a waveguide. The waveguide expands in a direction from the first end towards the second end.

8 Claims, 10 Drawing Sheets

(51) Int. Cl.
*E21B 17/02* (2006.01)
*H01Q 1/22* (2006.01)

(56) References Cited

U.S. PATENT DOCUMENTS

| | | | | |
|---|---|---|---|---|
| 2009/0266609 | A1* | 10/2009 | Hall | E21B 47/00<br>175/45 |
| 2017/0254194 | A1* | 9/2017 | Mazyar | G01L 1/20 |
| 2017/0314390 | A1* | 11/2017 | Thompson | H01P 5/184 |

* cited by examiner y pipe section wall
x pipe section interior
a,b,c pipe sections of drill string y pipe section wall
x pipe section interior
a,b,c pipe sections of drill string y pipe section wall
x pipe section interior
a,b,c pipe sections of drill string

DATA COMMUNICATION IN THE MICROWAVE RANGE USING ELECTRICALLY CONDUCTIVE ELEMENTS IN A CONSTRUCTION MACHINE

DESCRIPTION

The present patent application relates to the field of communications engineering. It relates to using electrically conductive elements or pipes of a construction equipment as a waveguide for the data communication. Embodiments concern the data communication in the microwave range over a pipe or drill pipe, e.g., in tunnel construction and mining applications, especially in connection with non-accessible drilling tools.

For construction equipment, it is desired to transfer data between various parts of a construction machine. For example, in tunnel construction and mining applications, it is desired to exchange sensor data or control data between a drill head in the underground and a drive at the surface. For example, it may be desired to monitor the rotation of or the forces applied to roller bits attached to the drill head in e.g., a raise drilling application or the rotation of or the forces applied to a cutting wheel of a drill head while drilling the bore hole. The data transmission is required to allow for timely reacting to certain events associated with the drill head, for example, to change worn parts or to avoid expensive deficient drilling. This in turn requires that data may be transmitted over a certain distance with a certain data rate. However, for the above applications, the presently available data rates are too low, the presently available operating distances are too short, or both.

The mud-pulse telemetry is one of the presently used systems to transfer data between the drill head in the underground and the drive at the surface. However, the mud-pulse telemetry is only usable if the drilling mud or slurry circuitry is attached and in operation. In addition, in the mud-pulse telemetry, the information is transferred by using pressure changes in the drilling mud or slurry. This results in data rates of a few bits per second which are typically too low.

A further known system used in construction and mining applications is the electromagnetic telemetry, for example, as used by the company Halliburton/Sperry Drilling. In this system, the drilling string is used as a transmit antenna for a communication in the frequency range between 2 and 10 Hz. A receive antenna is installed in the ground at a distance of about 100 m from the drill string. The low data rates and high complexity are disadvantageous of the presently used electromagnetic telemetry systems.

It is the object of the present invention to at least in part overcome one or more deficiencies attributable to the prior art systems.

This object is addressed by a coupling element according to claim 1, a method according to claim 9, a system according to claim 16 and a drilling device according to claim 18.

A coupling element connectable to a string of one or more pipes, for example, a drill string of one or more pipes or drill pipes is provided. The coupling element configured to excite, responsive to a data signal fed to the coupling element, an electromagnetic wave in the string. The coupling element comprises: a feed portion at a first end of the coupling element, the feed portion to receive the data signal; a first electrically conductive portion extending from the feed portion towards a second end of the coupling element, the second end to be connected to the string for forming an electrically conductive connection between the first electrically conductive portion and the string; and a second electrically conductive portion extending from the feed portion towards the second end of the coupling element. The first and second electrically conductive portions are arranged so as to define a waveguide, the waveguide expanding in a direction from the first end towards the second end.

According to an embodiment, the second electrically conductive portion may comprise a portion formed so as to protrude into the string, when the coupling element is connected to the string.

According to an embodiment, the portion to protrude into the string may have a constant diameter.

According to an embodiment, the first electrically conductive portion and the second electrically conductive portion may be rotationally symmetric.

According to an embodiment, the coupling element may be connectable to the string so as to be rotatable.

According to an embodiment, the electromagnetic wave may have rotationally symmetric field lines.

According to an embodiment, the first electrically conductive portion may have a flange connectable to the flange of the string.

According to an embodiment, a coupling element as described above may be used in a drill string of one or more drill pipes.

A method for data communication in a construction equipment over a string of one or more pipes, for example, a drill string of one or more pipes or drill pipes is provided. The method comprises the steps of

- exciting, at a first end of the string, an electromagnetic wave carrying a data signal, the string acting as a waveguide, and
- coupling the electromagnetic wave from a second end of the string to obtain the data signal.

According to an embodiment, the electromagnetic wave may be excited using a coupling element as described above and/or the data signal may be coupled from the second end of the string using a coupling element as described above.

According to an embodiment, the string acting as the waveguide may have a band-pass property or a band-stop property so as to pass frequencies within certain ranges and to reject or attenuate frequencies outside the certain ranges, the certain ranges may define a plurality of channels, the plurality of channels may have the same or different bandwidths. The method may further comprise the steps of selecting from the plurality of channels a channel for transmitting the data signal, and transmitting the data signal using the selected channel.

According to an embodiment, selecting the channel may comprise the steps of selecting from list, which includes available channels for the string, an initial channel allowing for the data communication; testing one or more of the remaining available channels from the list so as to determine the respective communication qualities achievable by the respective channels; and selecting the channel providing the best communication quality, e.g., the channel having the lowest attenuation when compared to the initial channel and the remaining available channels.

According to an embodiment, selecting the channel may comprise the steps of testing channels in the string so as to determine the respective communication qualities achievable by the respective available channels; and selecting from the channels the channel providing the best communication quality, e.g., the channel having the lowest attenuation when compared to the other channels.

According to an embodiment, the testing and the selecting may be repeated during an operation of the construction equipment including the string

- periodically, and/or
- at certain intervals, and/or
- responsive to a certain event, e.g., in case a data transmission over the channel is no longer possible.

According to an embodiment, the method may further comprise, in response to determining that none of the channels provides a sufficient communication quality, selecting a predetermined channel.

A system for data communication in a construction equipment over a string of one or more pipes, for example, a drill string of one or more pipes or drill pipes is provided. The system comprises a first coupling element configured to excite, at a first end of the string, a first electromagnetic wave carrying a data signal, the string acting as a waveguide, and a second coupling element configured to couple the first electromagnetic wave from a second end of the string to obtain the data signal.

According to an embodiment, the first coupling element and/or the second coupling element may comprise a coupling element as described above.

A drilling device for drilling a hole along a drill path from a starting point to a destination point is provided. The drilling device contains a drill head, a drive for rotating the drill head, at least one pipe string, preferably a string of drill pipes, connected to the drill head, and an advancing unit for advancing the drill head along the drill path. The pipe string is connected to a first coupling element configured to excite, at a first end of the string, a first electromagnetic wave carrying a data signal, the pipe string acting as a waveguide, and a second coupling element configured to couple the first electromagnetic wave from a second end of the string to obtain the data signal.

According to an embodiment, the first coupling element and/or the second coupling element may comprise a coupling element as described above.

According to an embodiment, the method for data communication as described above may be used in a drilling method for drilling a hole along a drill path from a starting point to a destination point by rotating a drill head with a drive, advancing the drill head along the drill path with an advancing unit, providing a pipe string, preferably a string of drill pipes, connecting the drill head and the starting point.

Embodiments of the present invention will be discussed below with reference to the accompanying drawings.

FIG. 1, comprising FIGS. 1 (*a*)-1 (*d*), shows drilling systems in accordance with an embodiment of the present invention.

Figure 6A:
Figure 6B:
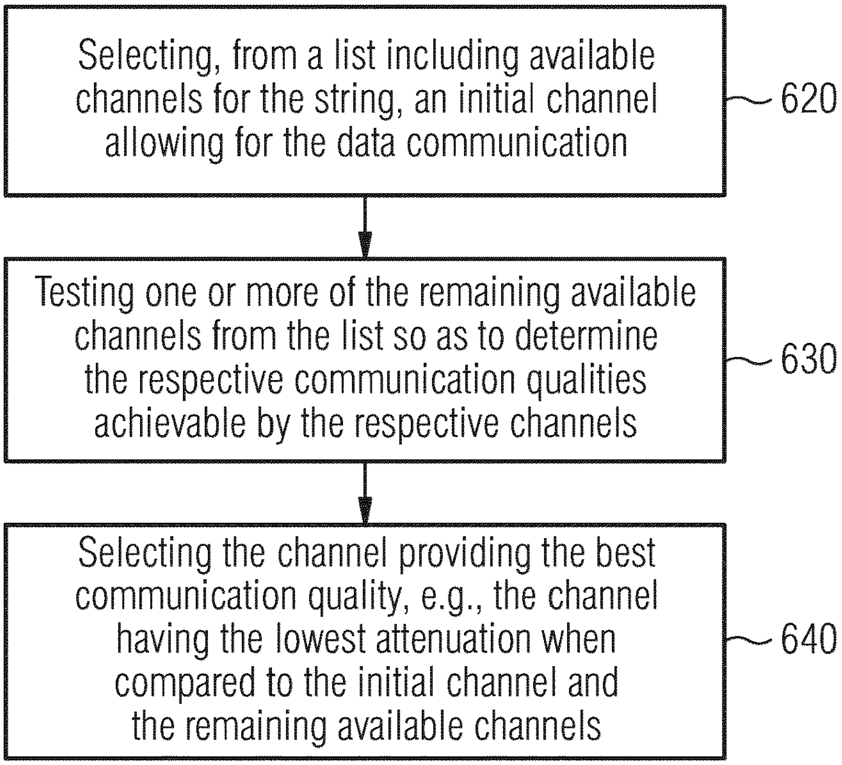
Figure 6C:
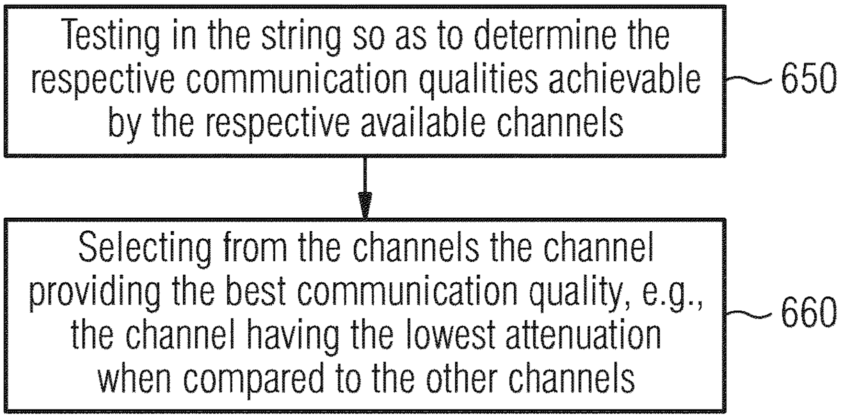
Figure 7A:
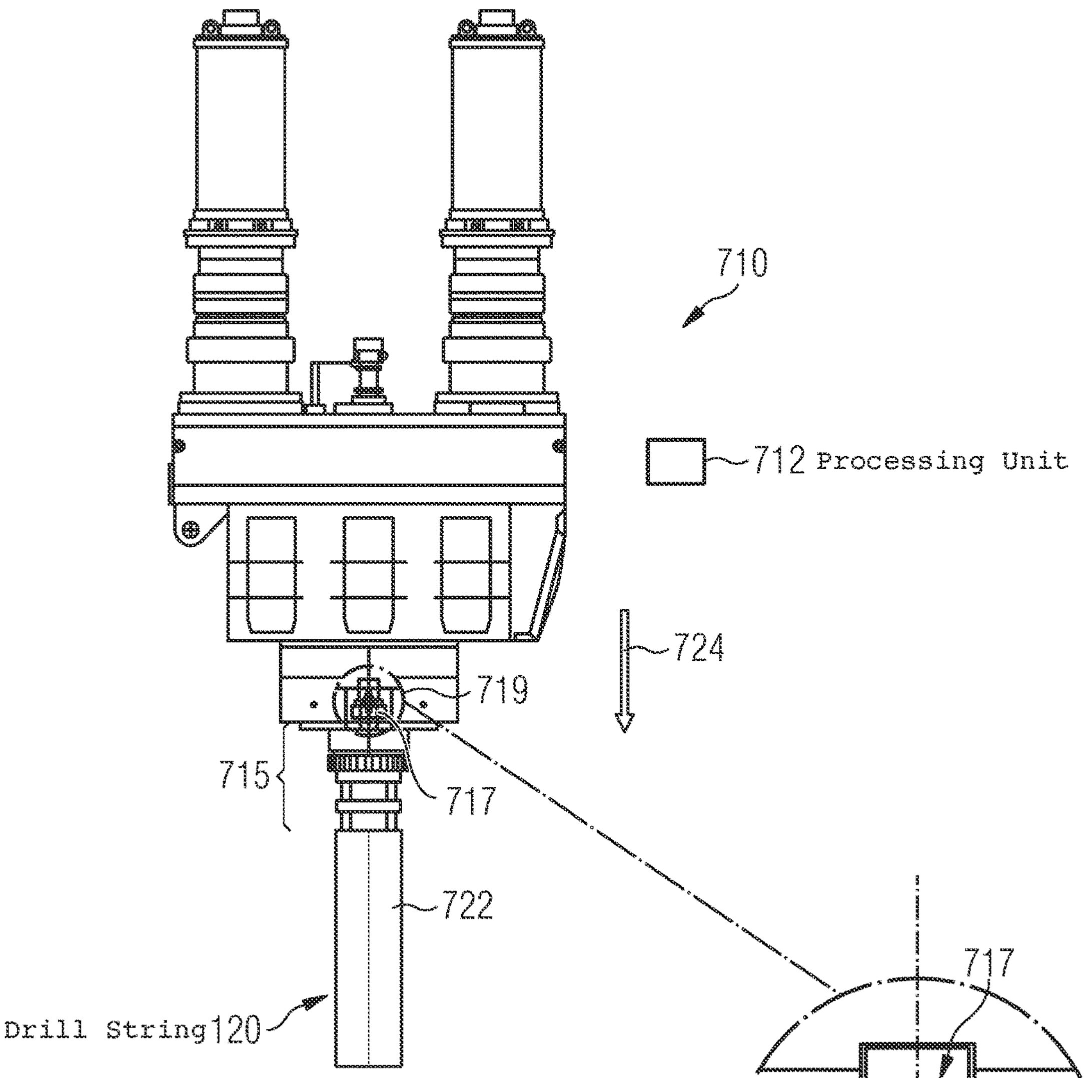
Figure 7C:
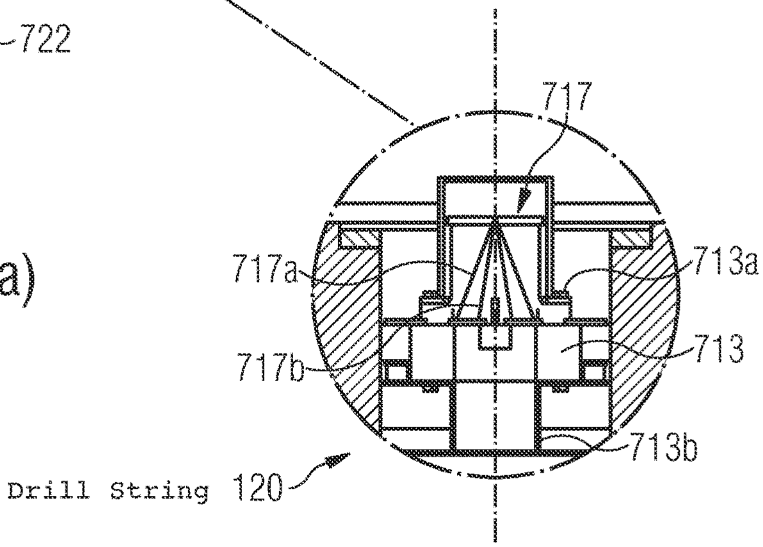
Figure 7B:
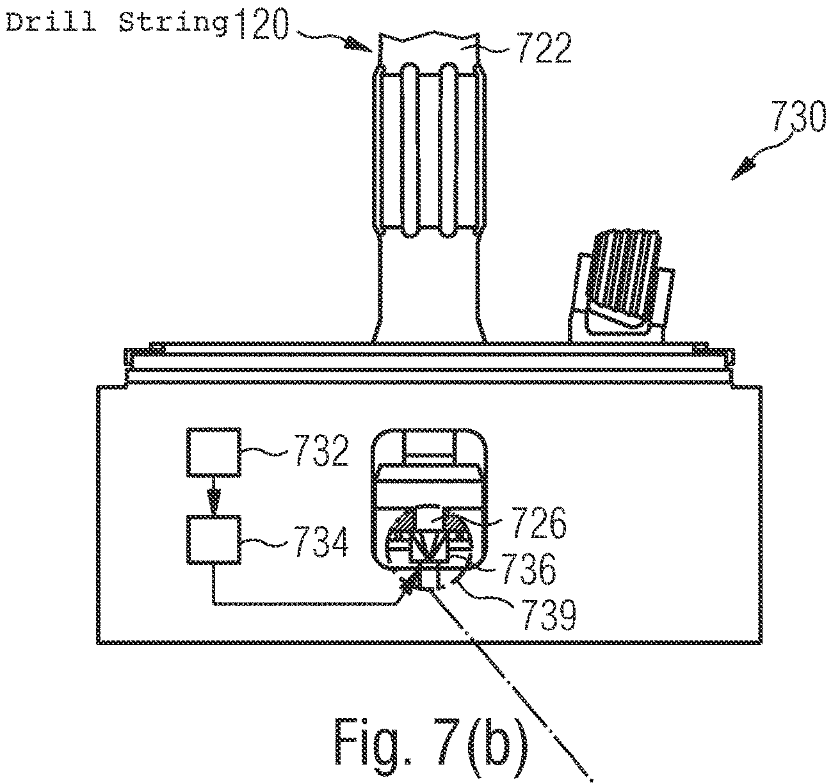
Figure 7D:
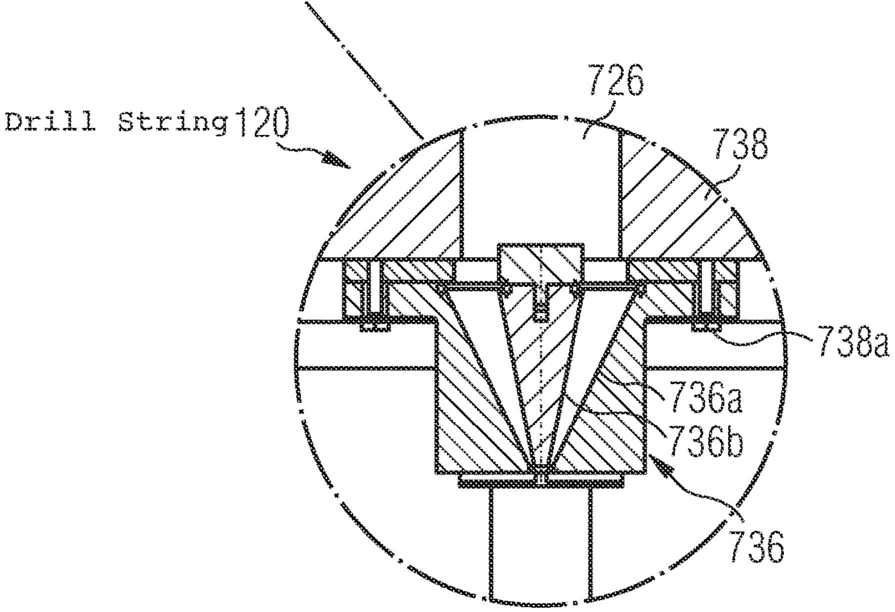

FIG. 6, comprising FIGS. 6 (*a*)-6 (*c*), illustrates additional steps which may be optionally performed in conjunction with the method for operating a system for data communication in a construction equipment according to the present invention.

FIG. 7 shows an embodiment of the system for data communication in accordance with the present invention, FIG. 7 (*a*) illustrates a part of the system located at a starting point, FIG. 7 (*b*) illustrates a part of the system located underground, FIG. 7 (*c*) shows an enlargement of a portion of the system of FIG. 7 (*a*), FIG. 7 (*d*) shows an enlargement of a portion of the system of FIG. 7 (*b*).

Figure 8A:
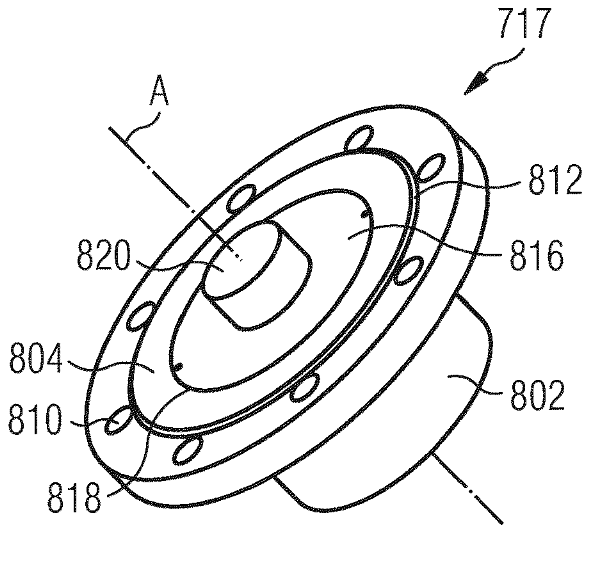
Figure 8B:
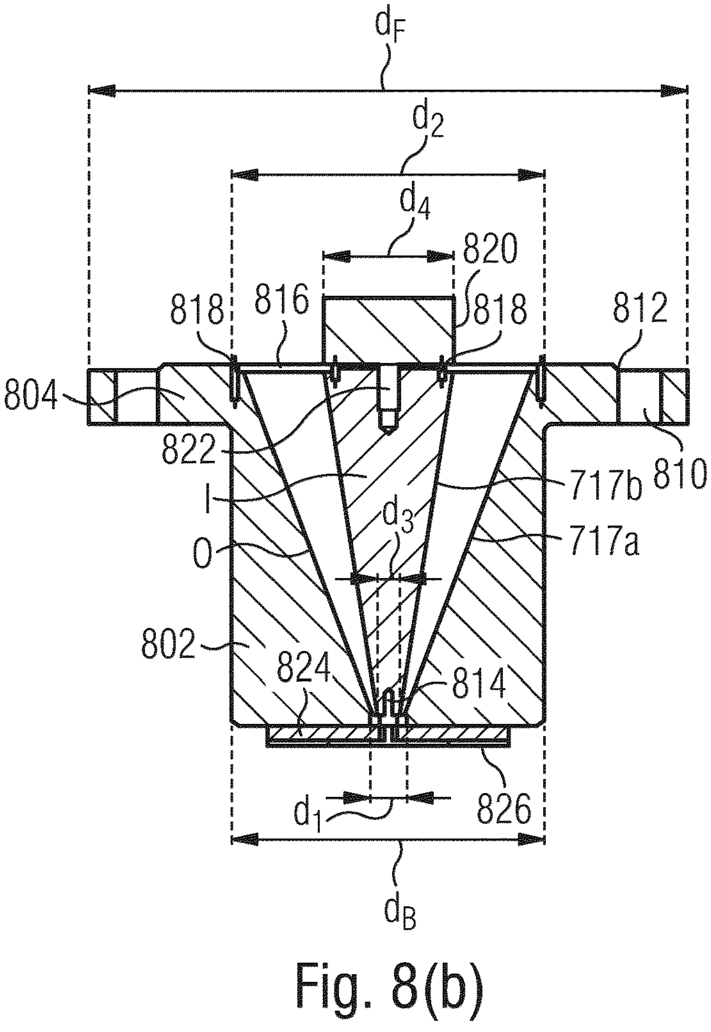

FIG. 8 illustrates an embodiment of a coupling element as used in FIG. 7 (*b*) in accordance with the present invention, FIG. 8 (*a*) is an isometric view, FIG. 8 (*b*) is a cross-sectional view.

Figure 9A:
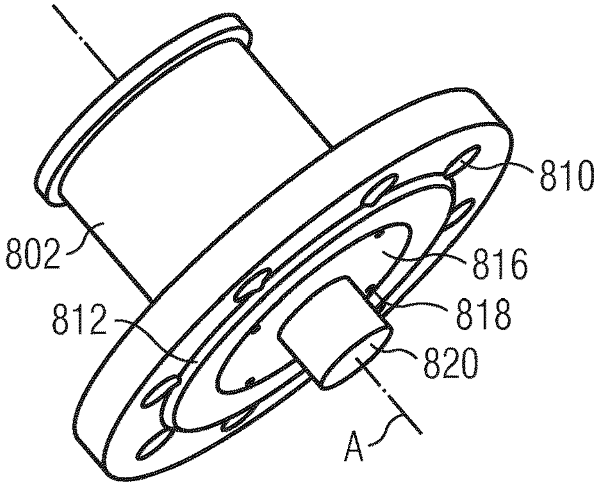
Figure 9B:
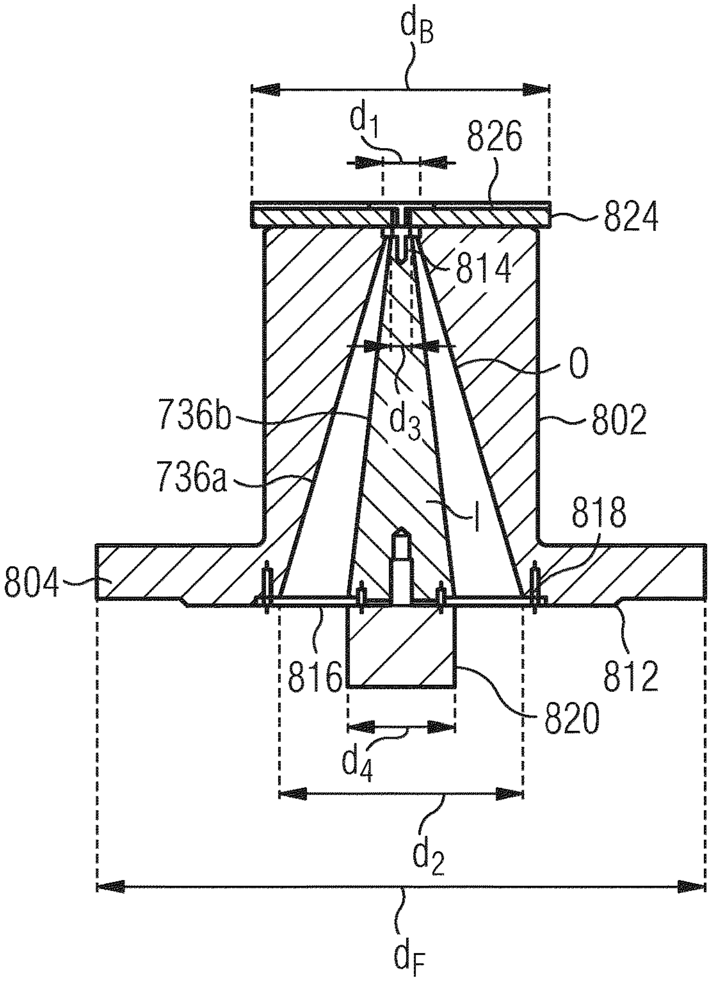

FIG. 9 illustrates an embodiment of a coupling element as used in FIG. 7 (*a*) in accordance with the present invention, FIG. 9 (*a*) is an isometric view, FIG. 9 (*b*) is a cross-sectional view.

FIG. 1 shows as an example three different drilling systems 100 (FIG. 1 (*a*), FIG. 1 (*b*), FIG. 1 (*c*), FIG. 1 (*d*)), which are examples of a construction equipment. The drilling systems comprise elements located at the "surface" 101, e.g. being non-limiting a drift, crosscut, gangway or heading, and elements located in the underground 102. A drilling machine 105 is located at the surface 101. The drilling machine 105 comprises a drive 110. The drive 110 drives a drill string 120 so as to cause the drill string 120 to rotate. The drill string 120 is made of a plurality of individual pipes, which are adjoined together to form the string 120. A drill head 130 is attached to the drill string 120 at the end of the drill string 120 which is located in the underground 102. By means of the drill head 130, a bore hole 160, 161 is driven into the underground 102. The drilling system and also the corresponding method can be applied at any angle between horizontal and vertical.

FIG. 1 (*a*) and (*b*) show two steps of a drilling system 100 which is called raise boring. A drilling machine 105 is positioned at a starting point/surface 101. Segments of the drill string 120 are connected to the drive 110 of the drilling machine 105 via coupling element 150 forming the drill string 120. A pilot bore drill head 130 is connected to the drill string 120 via the coupling element 140. The drill head 130 is advanced via moving the drill string 120 into the bore hole 161 by the drive 110 of the drilling machine 105. Additionally, the pilot drill head is either rotated by the drive 110 and/or by a bore motor (not shown). The pilot bore hole 161 is driven in the direction 175 downwards towards a destination point, e.g. being non-limiting in a further drift, crosscut, gangway or heading. Once the destination point is reached the pilot bore drill head is removed and drill head 130 e.g. a raise bore drill head is attached. The drill head 130 is advanced via moving the drill sting 120 out of the bore hole 161 by the drive 110 of the drilling machine 105. Additionally, the raise bore drill head 130 is either rotated by the drive 110 via the drill string and/or by a bore motor (not shown). The raise bore hole 160 is driven in the direction 170 upwards towards the starting point until reached. Horizontal or angled raise boring is also a possible drilling system 100.

The same applies to the drilling system 100 of FIG. 1 (*c*). Here up-hole reaming, also called up-reaming, box hole drilling, or blind hole drilling, is shown. A drilling machine 105 is positioned at a starting point/surface 101. Segments of the drill string 120 are connected to the drive 110 of the drilling machine 105 via coupling element 150 forming the drill string 120. A drill head 130 is connected to the drill string 120 via the coupling element 140. The bore hole 160 is driven in the direction 170 here upwards towards a destination point underground 102. This destination point can be anywhere just inside the ground/rock forming the underground 102 or also (non-limiting) a further drift, crosscut, gangway or heading or any other cavity. Once the destination point has been reached the drill head 130 is pulled out of the bore hole 160 by removing the segments of the drill string 120. Horizontal or angled box hole drilling is also a possible drilling system 100.

FIG. 1 (*d*) shows a further embodiment of the drilling system 100. Here, a drilling system similar to the system of FIG. 1 (*c*) is shown which e.g. is used for reef mining. In reef mining bore holes are drilled into ore veins, reefs or seams to selectively remove the mine raw material with little dilution by other materials. After the bore is completed the bore hole is e.g. filled with backfill e.g. containing cement. Then, after hardening a further hole is drilled next to the backfill. For this drilling system a drilling machine 105 is positioned at a starting point/surface 101. Segments of the drill string 120 are connected to the drive 110 of the drilling machine 105 via coupling element 150 forming the drill string 120. A drill head 130 is connected to the drill string 120 via the coupling element 140. The bore hole 160 is driven in the direction 170 here angled upwards towards a destination point underground 102. This destination point can be anywhere just inside the ground/rock forming the underground 102 or also (non-limiting) a further drift, crosscut, gangway or heading or any other cavity. Once the destination point has been reached the drill head 130 is pulled out of the bore hole 160 by removing the segments of the drill string 120. Horizontal or vertical reef mining drilling is also a possible drilling system 100.

For the drilling system 100, it is desirable to transmit data from the drill head 130 to the drive e.g. being sensor data associated with the drill head 130. Further, it is desirable to transfer data from the drive 110 to the drill head 130 e.g. being control data. According to the present invention, a hollow interior of the drill string 120 is used as a waveguide to transfer an electromagnetic wave between the drill head 130 and the drive 110. In order to transfer data from the drill head 130 to the drive 110, a coupling element 140 is used to excite the electromagnetic wave in the string 120 based on a signal carrying the sensor data of the drill head 130. The coupling element 140 may also be referred to as a mode coupler.

The electromagnetic wave travels through the interior of the drill string 120 from the drill head 130 towards the drill drive 110. Alternatively, a string of pipes can also be used. A coupling element 150 is used at the surface 101 to couple the electromagnetic wave from the drill string 120 to obtain the signal. The sensor data carried by the obtained signal may be used at the surface 101 by the drive 110 or a control equipment associated with the drive 110.

Similarly, the drive 110 or control equipment associated with the drive 110 may establish a control signal for the drill head 130. The coupling element 150 is used to excite at the surface 101 an electromagnetic wave in the string 120, which corresponds to the signal. The electromagnetic wave travels through the interior of the drill string 120 towards the drill head 130. It is coupled from the drill string 120 by the coupling 140 to obtain the signal at the drill head 130. Alternatively, a string of pipes can also be used. As a result, a bidirectional communication between the drill head 130 in the underground 102 and the drive 110 at the surface 101 is established. Changing the direction of communication can be done alternating or at the same time.

For data transfer as described before and will be described here after, it is preferred that the inside of the hollow drill string 120 is empty, especially unfilled with conductive liquids.

Figure 1A:
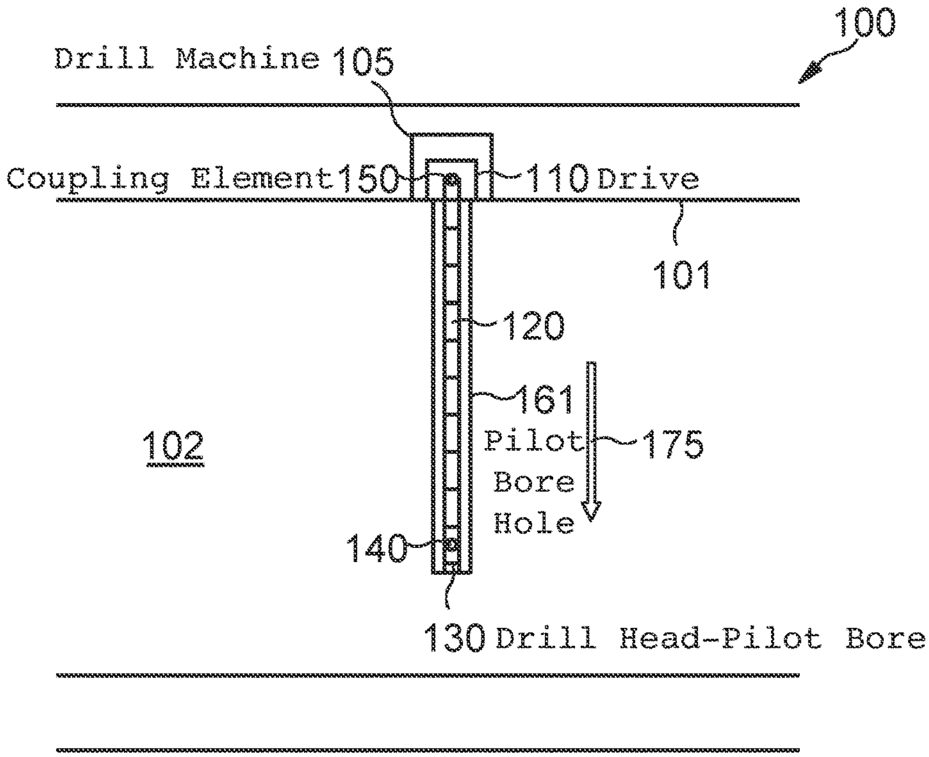
Figure 1B:
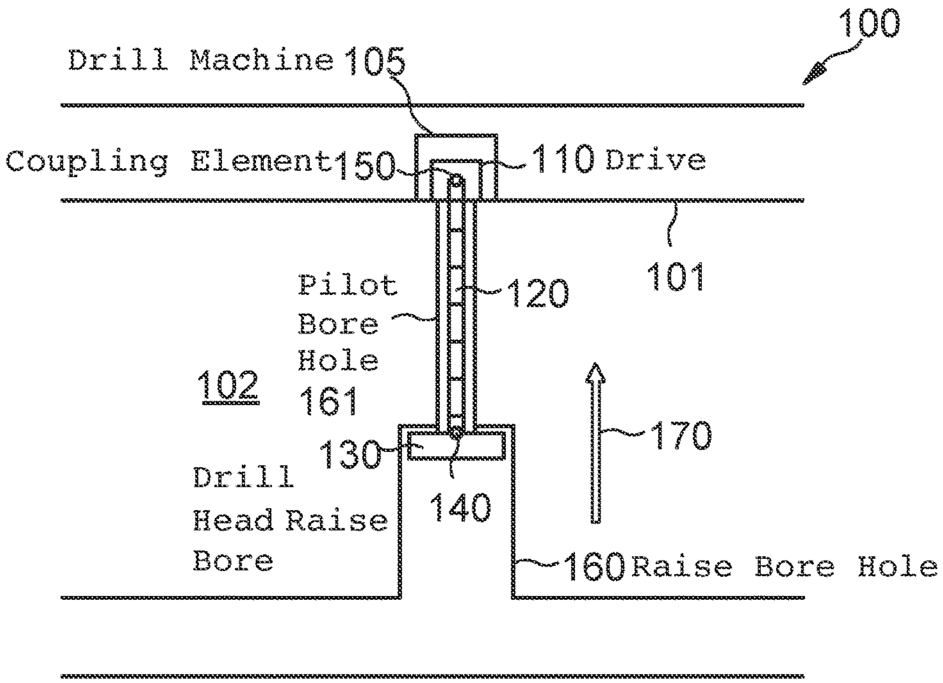
Figure 1C:
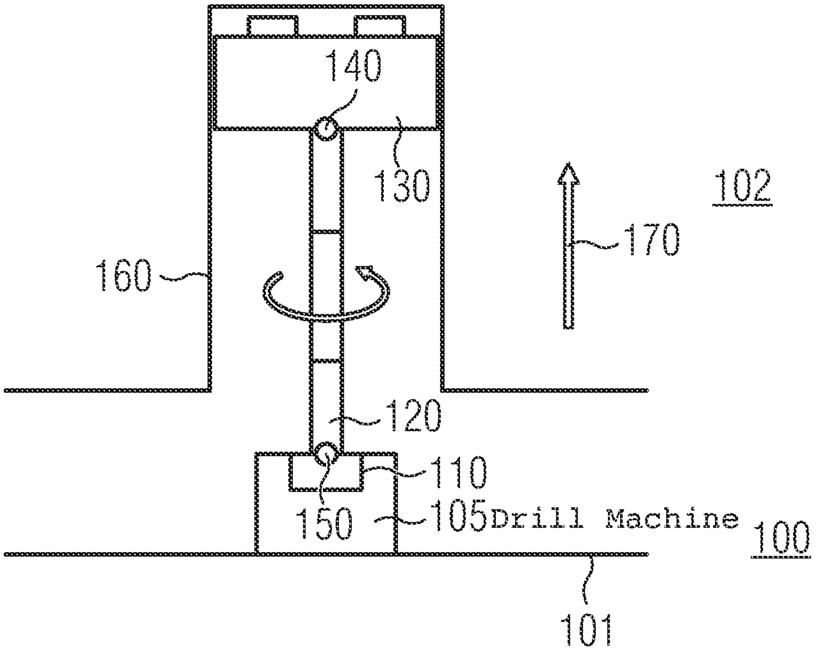
Figure 1D:
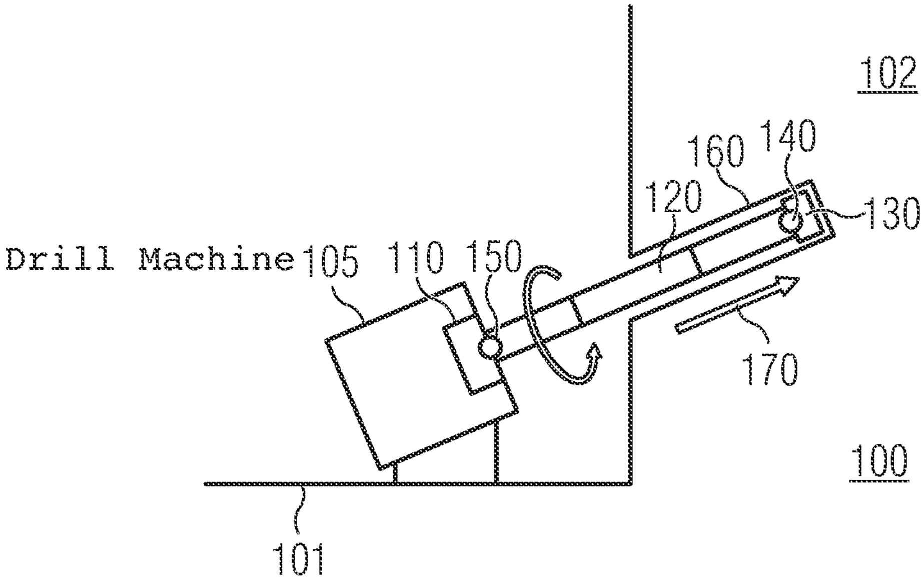
Figure 2:
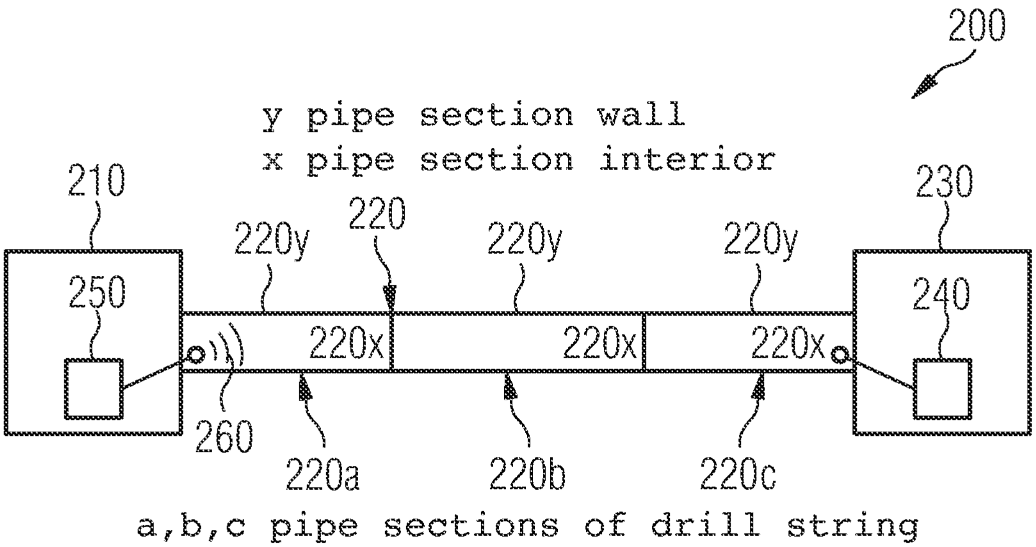
FIG. 2 shows a system for data communication in a construction equipment in accordance with the present invention.
Figure 3A:
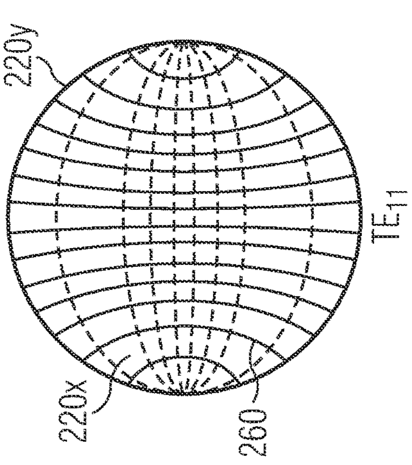
FIG. 3 shows six field line patterns in a cross-section of a string according to embodiments of the present invention.
Figure 3B:
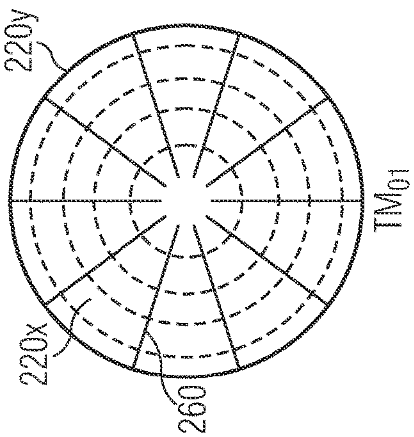
Figure 3C:
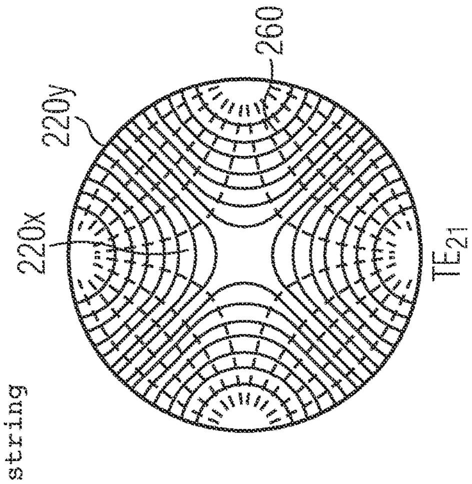
Figure 3D:
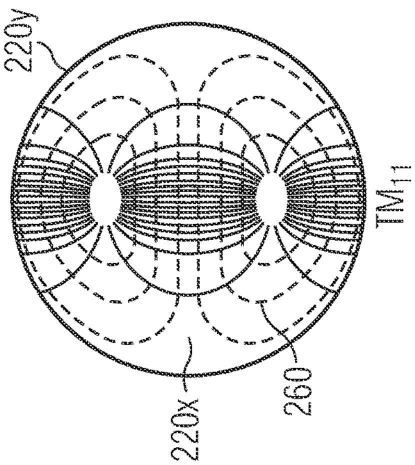
Figure 3E:
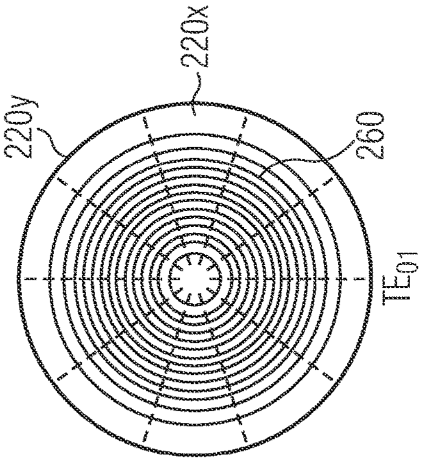
Figure 3F:
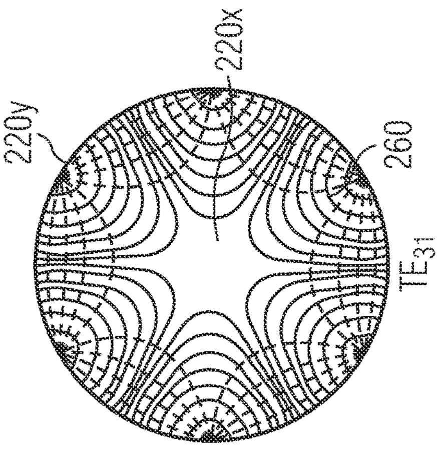

FIG. 2 shows a system for data communication 200 in a construction equipment in accordance with the present invention, e.g. a drilling system 100 as described before. The system comprises a string 220 of one or more pipes 220*a*, 220*b*, 220*c*, e.g. pipes of a drill string or pipes of a pipe string. The individual pipes are joined altogether to form the string 220. Each of the individual pipes 220*a*, 220*b*, 220*c*, has a hollow interior 220*x* and a wall 220*y*, which is made of an electrically conductive material. As a result, the string 220 is capable of acting as a waveguide for an electromagnetic wave.

In an embodiment, one end of the string 220 may be connected to a drive 210 like the one described above with reference to FIG. 1, whereas an opposite end of the string 220 may be connected to a drill head 230 like the one described above with reference to FIG. 1. But, the pipes do not have to be drill pipes. Also, an additional pipe sting just for data transfer as described here can also be used. Further, a first coupling element 250 like the one described above with reference to FIG. 1 is provided. The first coupling element 250 may be an element of the drive 210 or it may be attached to the drive 210. The first coupling element 250 receives a signal carrying data and excites an electromagnetic wave 260 in the interior 220*x* of the string 220. The electromagnetic wave 260 propagates through the interior of the string 220. In addition, a second coupling element 240 like the one described above with reference to FIG. 1 is provided. In an embodiment, the second coupling element 240 may be a part of the drill head 230 or it may be attached to the drill head 230. The electromagnetic wave 260 reaches the second coupling element 240 and it is coupled from the string 220 by the second coupling element 240 to obtain the signal carrying the data. As a result, the string 220 acts as a waveguide for the electromagnetic wave 260 and it allows for data communication from the first coupling element 250 to the second coupling element 240. Communication the other way round is also possible In an embodiment, the string 220 may have a circular cross section. FIG. 3 shows six field line patterns in the cross-section of the string 220 according to embodiments of the present invention having the string 220 with a circular cross section. Each of FIGS. 3 (*a*)-3 (*f*) show the wall 220*y* of a pipe 220*a*, 220*b*, 220*c* and the hollow interior 220*x* of the pipe 220*a*, 220*b*, 220*c*. The pipe 220*a*, 220*b*, 220*c* acts as a waveguide for the electromagnetic wave 260 which is present in the interior of the pipe. FIGS. 3 (*a*)-3 (*f*) show six different field line patterns for the modes $TE_{11}$, $TM_{01}$, $TE_{21}$, $TM_{11}$, $TE_{01}$ and $TE_{31}$, respectively. The field lines of the magnetic field are depicted by dashed lines, whereas the field lines of the electric field are depicted by solid lines. The embodiments of the system for data communication having the string 220 with a circular cross-section are advantageous in applications in which the angle between the drive 210 and the drill head 230 is variable. For example, during a drilling process, the string 220 is driven by the drive 210 which causes the string 220 and the drill head 230 to rotate and hence the angle between the drive 201 and the drill head 230 varies.

Figure 4:
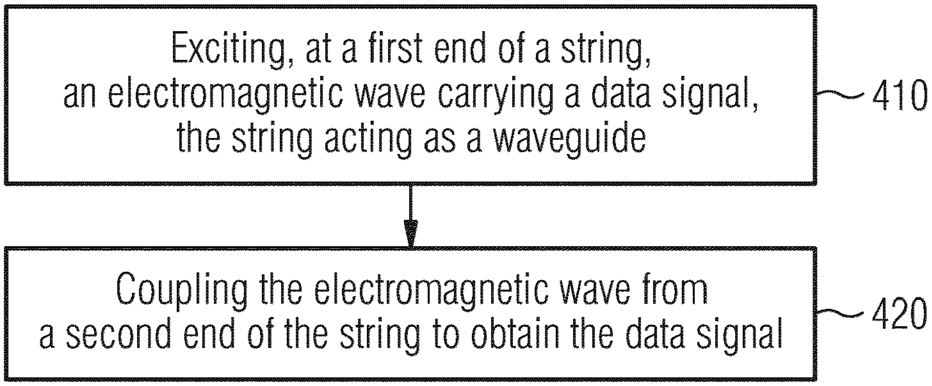
FIG. 4 shows a flow diagram illustrating a method for operating a system for data communication in a construction equipment according to the present invention.

FIG. 4 shows a flow diagram illustrating a method for operating the system for data communication 200 in a construction equipment according to the present invention as described above with reference to FIGS. 1 and 2. The flow diagram of FIG. 4 shows the step 410 in which the electromagnetic wave 260 corresponding to a signal carrying data is excited at a first end of the string 220. The string 220 acts thereby as a waveguide for the electromagnetic wave 260.

Further, FIG. 4 shows the step 420 in which the electromagnetic wave 260 is coupled from the string 220 to obtain the signal carrying the data.

Figure 5:
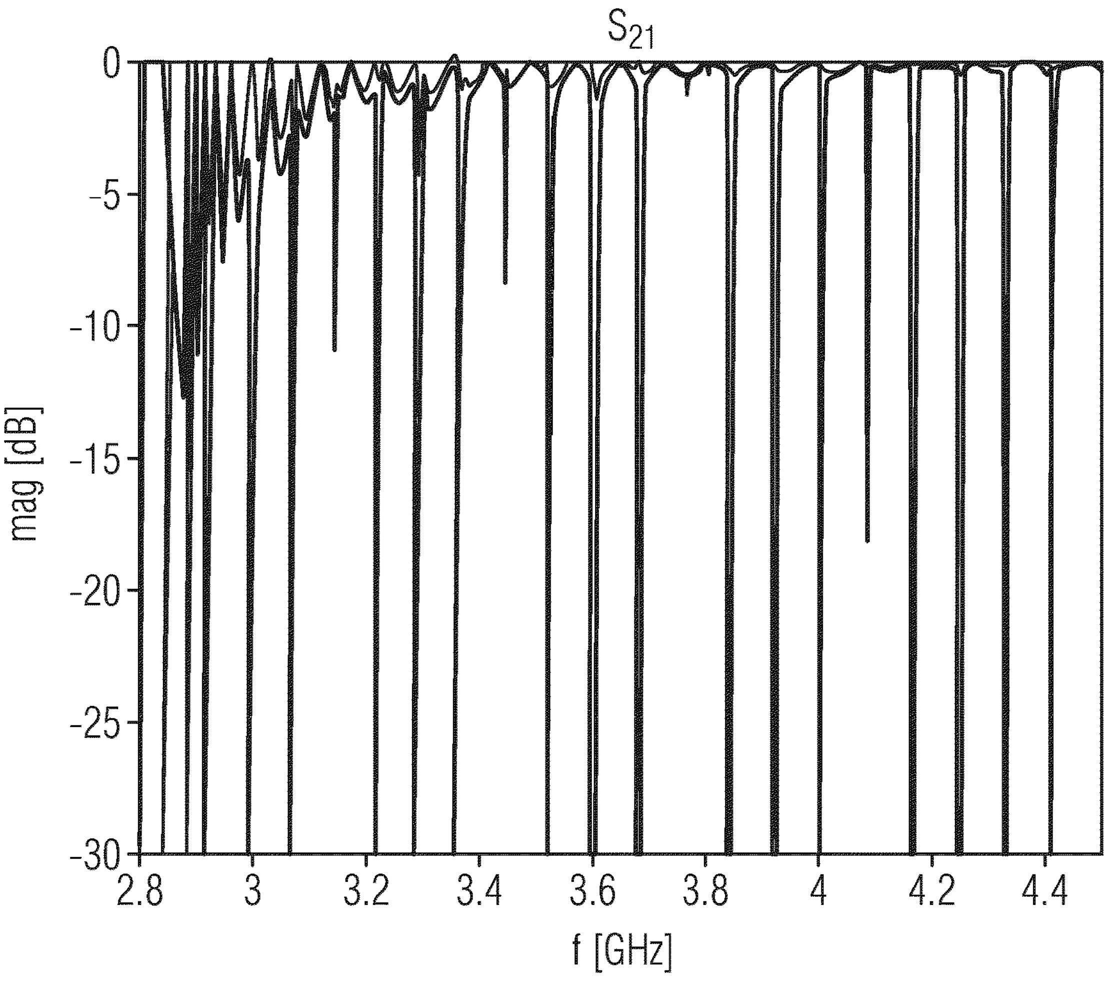
FIG. 5 shows a transfer function of a drill string made of 250 segments in accordance with an embodiment of the present invention.

In an embodiment, the string 220 may be a drill string e.g. made of 11 ¼ inch pipes as offered, e.g., by the company MICON GmbH & Co. KG. Each pipe has a length of approximately 1.7 m. The pipes are screwed together to form the drill string. In the sections of the screwing, the inner diameter of the pipes enlarges. Due to these disturbing enlargements, the drill string has a band-pass property or a band-stop property so as to pass frequencies within certain ranges and to reject or attenuate frequencies outside of these ranges. FIG. 5 shows a transfer function of such a drill string made of 250 segments. In FIG. 5, the parameter $s_{21}$ is depicted as a function of frequency. The band-pass property i.e., the property to pass frequencies within certain ranges, is recognizable in FIG. 5. Also, a usable frequency range, which is located in the microwave range and usable bands of a few megahertz are recognizable in FIG. 5. Thus, for a given drill string, frequency bands for which transmission is possible may be generally identified by means of calculations, e.g., numerical calculations or simulations. Based on such identified information, an appropriate channel or channels for data communication may be adaptively selected.

FIG. 6 comprising FIGS. 6 (*a*)-6 (*c*) illustrates additional steps which may be optionally performed in conjunction with the method described in FIG. 4 above. In the step 610 shown in FIG. 6 (*a*), a channel for transmitting the signal is selected and the signal is transmitted using the selected channel. The channel is selected from a plurality of available channels. The available channels are in turn determined based on available frequency bands. The available frequency bands are determined based on the transfer function and relate to frequencies, for which the transfer function is above a predetermined value, for example, higher than −5 dB such that a reliable data communication can be established. The plurality of channels may have the same or different bandwidth.

The channel may be selected from the plurality of channels so as to satisfy a predetermined data communication criterion, for example, a predetermined data rate. The method step of selecting a channel for transmitting the signal, 610, may comprise additional steps which are described in conjunction with FIGS. 6 (*b*) and 6 (*c*) below.

In the method step 620 illustrated in FIG. 6 (*b*), an initial channel allowing for data communication is selected. The initial channel is selected from a list which includes channels available for communication for the given string. In the method step 630, the remaining available channels for the given string are tested so as to determine their respective communication qualities, for example, the achievable data rate, the channel attenuation, or the like. Based on the testing results for the remaining channels, a channel providing the best communication quality, for example, the channel having the lowest attenuation or having the highest data rate compared to the initial channel and the remaining available channels is selected for the data communication in the method step 640.

FIG. 6 (*c*) illustrates optional steps which may be comprised in the method step 610. The string is tested so as to determine the respective communication qualities, which are achievable by the available channels in the method step 650. A channel having the best communication quality, e.g., the channel having the lowest attenuation or the channel having the highest data rate, is selected for transmitting the signal in the method step 660.

The method steps illustrated in FIGS. 6 (*b*) and 6 (*c*) may be repeated during an operation of the construction equipment comprising the string. The repetition may be periodic or may occur at certain intervals. Alternatively or in addition, the repetition may be responsive to a certain event, e.g., in case a data transmission over the previously selected channel is no longer possible. In response to determining that none of the channels provide sufficient communication quality, a predetermined channel is selected for transmitting the signal.

The method for operating the system for data communication 200 according to the present invention may use any narrow-band modulation scheme, for example, the frequency shift keying (FSK) modulation scheme. Alternatively, a chirp sequence based modulation scheme, for example, the LoRa modulation scheme may be used. In addition, the time division duplexing may be used in order to allow for a bi-directional data communication. Alternatively, a frequency division duplexing may be used. As a result, the data communication for distances of a few hundred meters up to 2000 meters or more may be established. The achievable data rates may be in the range of hundreds of kbit per second and hence above the data rates achievable so far.

FIG. 7 shows an embodiment of the system for data communication 200 in accordance with the present invention. It shows a specific construction equipment, namely a drilling system known as a Raise Boring Rig. FIG. 7 (*a*) illustrates a part of the system located at the surface, FIG. 7 (*b*) illustrates a part of the system located in the underground, FIG. 7 (*c*) shows an enlargement of a portion of the system located at the surface, FIG. 7 (*d*) shows an enlargement of a portion of the system located at the surface.

As shown in FIG. 7 (*a*), the drilling system comprises a drive portion 710 and an attachment portion 715, both of which are located at the surface. The drilling system also comprises a string 120 which is made of a plurality of pipes. An individual pipe of the drill string 120 is fixed in the attachment portion 715. The drive portion 710 rotates the attachment portion 715 and thereby rotates also the string 120. The drill string 120 is rotated about its axis 722. A thrust portion (not shown) exhibits a force onto the attachment portion 715 along the axis 722 in a direction denoted by the arrow 724. Thereby a hole, here a pilot bore hole, is drilled in the underground by the pilot bore head via the pipe.

As soon as a certain pipe is brought sufficiently deep into the underground, the drive portion 710 and the attachment portion 715 are moved in a direction opposite to the direction indicated by arrow 724, thereby allowing that a pipe handling portion (not shown) attaches a further pipe into the drill string 120. The other pipe is also attached to the attachment portion 715. The attachment portion 715 is again rotated by the drive portion 710. The force is again exhibited onto the attachment portion 715 such that the drilling operation progresses. The above procedure is repeated and thereby a hole is drilled. The drilled hole corresponds to the diameter of the drill string 120/the pilot bore drill head 130.

As soon as the drill head together with the string 120 reaches a tunnel or another accessible cavity, a drill head 730 (see FIG. 7 (*b*)) is attached to the end of the drills string 120 located in the underground. The drill head 730 is brought into the tunnel and is attached to drill string 120. The drill string 120 with the attached drill head 730 attached is shown in FIG. 7*b*. The drill string 120 with the drill head 730 attached to it is rotated by the drive portion 710. A force is exerted onto the attachment portion 715 in a direction which is opposite to the direction indicated by the arrow 724.

Thereby, a hole is drilled in the underground, with a diameter which corresponds to the diameter of the drill head 730. The hole is drilled in the direction which is opposite to the direction denoted by the arrow 724. The individual pipes are detached from the drill string 120 by the pipe handling portion as the drilling progresses.

As shown in FIG. 7 (*b*), one or more sensors 732 may be attached to the drill head 730 or may be integrated into the drill head 730. The one or more sensors 732 collect data related to the operation of the drill head 730 and provide the data to a processing unit 734, which is connected to the sensors 732. The processing unit 734 is in turn connected to a coupling element 736 in accordance with an embodiment of the present invention. The processing unit 734 processes the sensor data and provides a signal to the coupling element 736. The signal carries the sensor data. The coupling element 736 excites an electromagnetic wave in an interior 726 of the drill string 120. The electrometric wave corresponds to the signal provided to the coupling element 736 and thereby communicates the data through the interior of the string 720. At the end of the drill string 720 located at the surface, a coupling element 717 in accordance with an embodiment of the present invention couples the electromagnetic wave from the drill string 720 to obtain the signal.

The signal obtained by the coupling 717 is provided by the coupling 717 to a processing unit 712 by using a wired connection or wirelessly. The processing unit 712 processes the signal so as to obtain the sensor data. The coupling element 717 may be attached to the attachment portion 715 such that it is fixed relative to the drive portion 710 or such that it rotates relative to the drive portion 710. In case the coupling element 717 rotates relative to the drive portion 710, a rotary coupling may be provided in order to transfer signals between the drive portion 710 and the coupling element 717. The rotary coupling may also be used to provide electric power to power, for example, electric components such as amplifiers or filters, which may be attached to or integrated with the coupling element 717. Such electric components may be useful for conditioning of the signal obtained by the coupling element 717 from the interior 726 of the drill string 720 prior to providing the obtained signal to the processing unit 712.

FIG. 7 (*c*) shows an enlargement of a part of the attachment portion 715 comprising the coupling element 717 and a part of the drill string 120. The parts of the attachment portion 715 and the drill string 120, which are shown in FIG. 7 (*c*), are indicated in FIG. 7 (*a*) by using the circle 719.

The coupling element 717 shown in FIG. 7 (*c*) comprises a first electrically conductive portion 717*a* and a second electrically conductive portion 717*b*. FIG. 7 (*c*) shows also an adapter 713. The adapter 713 is mechanically coupled to the first electrically conducive portion 717*a* by using screws 713*a*. The adapter 713 is also in an electrical contact with the first electrically conductive portion 717*a*. The adapter 713 comprises an attachment portion 713*b*. The attachment portion 713*b* is a tube having a diameter corresponding to the diameter of a pipe of the drill string 120, which is attached to the attachment portion 715 of the drilling system. By means of the adapter 713, an electrically conductive connection between the first electrically conductive portion 717*a* and the pipe is ensured. The electrically conductive connection may comprise any low-resistance connection.

FIG. 7 (*d*) shows an enlargement of a part of the attachment portion comprising the coupling element 736 and a part of the drill string 120. The parts of the attachment portion and the drill string 120, which are shown in FIG. 7 (*d*), are indicated in FIG. 7 (*b*) by using the circle 739.

The coupling element 736 shown in FIG. 7 (*d*) comprises a first electrically conductive portion 736*a* and a second electrically conductive portion 736*b*. FIG. 7 (*d*) shows also an adapter 738. The adapter 738 is mechanically coupled to the first electrically conducive portion 73*a* by using screws 738*a*. The adapter 738 is also in an electrical contact with the first electrically conductive portion 736*a*. By means of the adapter 738, an electrically conductive connection between the first electrically conductive portion 736*a* and the pipe is ensured. The electrically conductive connection may comprise any low-resistance connection.

FIG. 8 illustrates an embodiment of the coupling element 717 described above with reference to FIG. 7. FIG. 8 (*a*) is an isometric view, and FIG. 8 (*b*) is a cross-sectional view. It is noted that those elements of the coupling element 717 already described above have associated the same reference signs and are not described again.

The coupling element 717 is rotationally symmetric around the axis A and it is to be connected with tubular or cylindrical pipes. When the coupling element 717 is mounted to a pipe, directly or using the adapter 713, the axis A coincides with the axis 722 of the pipe. FIG. 8 (*b*) is a cross-sectional view in a direction perpendicular to the axis A.

The coupling element 717 comprises a cylindrical body section 802 having a diameter $d_B$ and a cylindrical flange section 804 having a diameter $d_F$. The diameter $d_F$ is greater than the diameter $d_B$. The diameter $d_F$ of the flange section corresponds to the diameter of the pipe to which the coupling element 717 may be mounted and which includes a flange to which the flange section 804 of the coupling element 717 may be connected. In the depicted embodiment, the body section 802 and the flange section 804 are shown as integral parts. However, the invention is not limited to such embodiments. The body section 802 and the flange section 804 may be separate elements connected to each other, for example, by clamping, by welding, by screws or the like.

The coupling element 717 comprises a conical opening O extending from a first end to a second end. The opening O has a first diameter $d_1$ at the first end which is smaller than a second diameter $d_2$ at the second end. The body section 802 and the flange section 804 may be formed of an electrically conducive material so as to provide the first electrically conductive portion 717*a*. In accordance with other embodiments, the body section 802 and the flange section 804 may be formed of an insulating material with an electrically conductive layer on the surface of the conical opening O and the part of the flange portion 804 facing the pipe.

The flange section 804 comprises a plurality of holes 810 dispersed circumferentially at a diameter which is greater than the diameter $d_2$ and smaller than the diameter $d_F$. In addition, the flange section 804 comprises also a protrusion 812 located at the surface of the flange section 804 facing the pipe. The protrusion 812 is located at a diameter which corresponds to the diameter at which the inwards of the holes 810 are located.

The coupling element 717 comprises a conically shaped insert I mounted at the first end. The insert I has a diameter $d_3$ at the first end, which is smaller than the diameter $d_1$, and a diameter $d_4$ at the second end, which is smaller than the dimeter $d_2$. The insert I may be formed of an electrically conductive material so as to provide the second electrically conductive portion 717*b*. In accordance with other embodiments, the insert I may be formed of an insulating material with an electrically conductive layer on its surface. The insert I is mounted to the body section 802 by using, e.g., a screw 814. The insert I is supported on the flange section 804 by using a supporting portion 816, e.g., a plate, a disc or the like, made of an electrically non-conductive material, e.g., plastic, Polytetrafluoroethylene, or the like. The supporting portion 816 is mounted to the insert I and to the flange section 804 by using screws 818.

The diameters $d_1$, $d_2$, $d_3$ and $d_4$ are selected so as to provide a waveguide between the first electrically conductive portion 717*a* and the second electrically conductive portion 717*b*. The waveguide may have a predetermined wave impedance. For example, the wave impedance may equate to 50 Ohm.

The insert I is electrically and mechanically coupled to a portion 820. The portion 820 is formed as to protrude into a pipe or into the adapter 713, when the coupling element 717 is mounted to a pipe. The portion 820 is mechanically coupled to the insert I by using the thread 822. The portion 820 may excite the mode $TM_{01}$ in the pipe.

FIG. 8 shows, in addition, a spacer 824 and a printed circuit board 826. The spacer 824 is mounted to the body portion 802, the printed circuit board 826 is mounted to the spacer 824. The printed circuit board 826 is electrically coupled to a feed portion of the coupling element so as to provide a signal to the coupling element 717.

FIG. 9 illustrates an embodiment of the coupling element 736 described above with reference to FIG. 7. FIG. 9 (*a*) is an isometric view, and FIG. 9 (*b*) is a cross-sectional view. It is noted that those elements of the coupling element 736 already described above have associated the same reference signs and are not described again.

The coupling element 736 is rotationally symmetric around the axis A and it is to be connected with tubular or cylindrical pipes. When the coupling element 736 is mounted to a pipe, directly or using the adapter 738, the axis A coincides with the axis 722 of the pipe. FIG. 9 (*b*) is a cross-sectional view in a direction perpendicular to the axis A.

The coupling element 736 comprises a cylindrical body section 802 having a diameter $d_B$ and a cylindrical flange section 804 having a diameter $d_F$. The diameter $d_F$ is greater than the diameter $d_B$. The diameter $d_F$ of the flange section corresponds to the diameter of the pipe to which the coupling element 736 may be mounted and which includes a flange to which the flange section 804 of the coupling element 736 may be connected. In the depicted embodiment, the body section 802 and the flange section 804 are shown as integral parts. However, the invention is not limited to such embodiments. The body section 802 and the flange section 804 may be separate elements connected to each other, for example, by clamping, by welding, by screws or the like.

The coupling element 736 comprises a conical opening O extending from a first end to a second end. The opening O has a first diameter $d_1$ at the first end which is smaller than a second diameter $d_2$ at the second end. The body section 802 and the flange section 804 may be formed of an electrically conducive material so as to provide the first electrically conductive portion 736*a*. In accordance with other embodiments, the body section 802 and the flange section 804 may be formed of an insulating material with an electrically conductive layer on the surface of the conical opening O and the part of the flange portion 804 facing the pipe.

The flange section 804 comprises a plurality of holes 810 dispersed circumferentially at a diameter which is greater than the diameter $d_2$ and smaller than the diameter $d_F$. In addition, the flange section 804 comprises also a protrusion 812 located at the surface of the flange section 804 facing the pipe. The protrusion 812 is located at a diameter which corresponds to the diameter at which the inwards of the holes 810 are located.

The coupling element 736 comprises a conically shaped insert I mounted at the first end. The insert I has a diameter $d_3$ at the first end, which is smaller than the diameter $d_1$, and a diameter $d_4$ at the second end, which is smaller than the dimeter $d_2$. The insert I may be formed of an electrically conductive material so as to provide the second electrically conductive portion 736*b*. In accordance with other embodiments, the insert I may be formed of an insulating material with an electrically conductive layer on its surface. The insert I is mounted to the body section 802 by using, e.g., a screw 814. The insert I is supported on the flange section 804 by using a supporting portion 816, e.g., a plate, a disc or the like, made of an electrically non-conductive material, e.g., plastic, Polytetrafluoroethylene, or the like. The supporting portion 816 is mounted to the insert I and to the flange section 804 by using screws 818.

The diameters $d_1$, $d_2$, $d_3$ and $d_4$ are selected so as to provide a waveguide between the first electrically conductive portion 736*a* and the second electrically conductive portion 736*b*. The waveguide may have a predetermined wave impedance. For example, the wave impedance may equate to 50 Ohm.

The insert I is electrically and mechanically coupled to a portion 820. The portion 820 is formed as to protrude into a pipe or into the adapter 738, when the coupling element 736 is mounted to a pipe. The portion 820 is mechanically coupled to the insert 1 by using the thread 822. The portion 820 may excite the mode $TM_{01}$ in the pipe.

FIG. 9 shows, in addition, a spacer 824 and a printed circuit board 826. The spacer 824 is mounted to the body portion 802, the printed circuit board 826 is mounted to the spacer 824. The printed circuit board 826 is electrically coupled to a feed portion of the coupling element so as to provide a signal to the coupling element 736.

It is understood that the method for data communication, the system for data communication and the coupling element in accordance with the present invention may be used in any construction equipment having an arbitrary string which is capable of acting as a waveguide for an electromagnetic wave, for example, in any string having an electrically conductive wall and optionally having a circular cross-section. In other words, the references to the drilling equipment and to the drilling string in the present patent application are intended to be for illustrative purposes only.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

The invention claimed is:

1. A drilling device for drilling a hole along a drill path from a starting point to a destination point containing a drill head, a drive for rotating the drill head, at least one pipe string, the at least one pipe string having a clear interior during operation, connected to the drill head, and an advancing unit for advancing the drill head along the drill path, wherein the at least one pipe string is connected to a first coupling element configured to excite, at a first end of the at least one pipe string, a first electromagnetic wave carrying a data from a data signal, the at least one pipe string acting as a waveguide, and a second coupling element configured to couple the first electromagnetic wave from a second end of the at least one pipe string to obtain the data signal, wherein the first coupling element is configured to excite, responsive to the data signal directly electrically connected to the first coupling element, the first electromagnetic wave carrying the data from the data signal in the at least one pipe string, the first coupling element comprising:

a feed portion at a first end of the first coupling element, the feed portion configured to receive the data signal, a first electrically conductive portion extending from the feed portion towards a second end of the first coupling element, the second end of the first coupling element to be connected to the at least one pipe string for forming an electrically conductive connection between the first electrically conductive portion and the at least one pipe string, and a second electrically conductive portion extending from the feed portion towards the second end of the first coupling element, wherein the first and second electrically conductive portions and the clear interior of the at least one pipe string are configured as the waveguide, the first and second electrically conductive portions and the clear interior of the pipe string all expanding in a direction from the first end of the first coupling element towards the second end of the first coupling element and into the clear interior of the at least one pipe string.

2. The drilling device of claim 1, wherein the second electrically conductive portion comprises a portion formed so as to protrude into the at least one pipe string, when the coupling element is connected to the at least one pipe string.

3. The drilling device of claim 2, wherein the portion of the second electrically conductive portion to protrude into the at least one pipe string has a constant diameter.

4. The drilling device of claim 1, wherein the first electrically conductive portion and the second electrically conductive portion are rotationally symmetric.

5. The drilling device of claim 1, wherein the first coupling element and the second coupling element are rotatably connectable to the at least one pipe string.

6. The drilling device claim 1, wherein the first electromagnetic wave has rotationally symmetric field lines.

7. The drilling device claim 1, wherein the first electrically conductive portion has a flange connectable to a flange of the at least one pipe string.

8. The drilling device claim 1, wherein the at least one pipe string is a string of drill pipes.

* * * * *